United States Patent [19]
Hopper et al.

[11] 3,898,205
[45] Aug. 5, 1975

[54] SULFONAMIDE ADDITIVES FOR SULFUR VULCANIZABLE POLYMERS

[75] Inventors: Roger J. Hopper, Akron; John P. Lawrence, Stow, both of Ohio

[73] Assignee: The Goodyear Tire & Rubber Company, Akron, Ohio

[22] Filed: May 23, 1974

[21] Appl. No.: 472,755

Related U.S. Application Data

[62] Division of Ser. No. 266,009, June 26, 1972, Pat. No. 3,856,762.

[52] U.S. Cl. ... 260/79.5 B; 260/79.5 A; 260/79.5 P; 260/780; 260/791; 260/792
[51] Int. Cl.² .......................................... C08F 28/00
[58] Field of Search...... 260/79.5 A, 79.5 P, 79.5 B, 260/780, 791, 792, 268 S, 293.85, 293.51

[56] References Cited
UNITED STATES PATENTS

| | | | |
|---|---|---|---|
| 3,678,017 | 7/1972 | Shelton et al. | 260/79.5 B |
| 3,703,500 | 11/1972 | Nast et al. | 260/79.5 B |

*Primary Examiner*—Ronald W. Griffin
*Attorney, Agent, or Firm*—F. W. Brunner; J. A. Rozmajzl

[57] ABSTRACT

Sulfonamides such as N,N'-bis (N-methyl-p-toluenesulfonamidothio)-piperazine are used to affect the vulcanization characteristics of sulfur vulcanizable polymers by increasing the state of vulcanization and/or improving scorch resistance and/or increasing the rate of vulcanization.

7 Claims, No Drawings

SULFONAMIDE ADDITIVES FOR SULFUR VULCANIZABLE POLYMERS

This application is a division of our application Ser. No. 266,009, filed June 26, 1972, now U.S. Pat. No. 3,856,762.

This invention relates to compounds which generally function to increase the state (degree) of vulcanization when used during the sulfur vulcanization of rubbers by donating sulfur to the system. This invention also relates to compounds which provide a vulcanizable polymer with balanced processing and vulcanization characteristics. In addition, it relates to compounds which retard vulcanization during the processing of vulcanizable rubbery compositions. It also relates to compounds which function as activators, that is, secondary accelerators in sulfur type vulcanization systems. It also relates to processes for increasing the state of vulcanization of sulfur vulcanizable rubbery compositions and either increasing scorch delay periods and/or increasing vulcanization rates. It also relates to the vulcanized products resulting therefrom.

The physical properties of a vulcanized composition are related to its state of vulcanization. Often, as the state of vulcanization is increased, certain physical properties are improved. Rubber additives such as sulfur donors can be used therefore to increase the state of vulcanization or to permit the use of lesser amounts of free sulfur.

Scorching during the processing of rubber is due to the premature or insipient vulcanization which can occur during any of the steps involved in the processing of the rubber prior to the final vulcanization step or during storage between said processing steps. Whereas a properly compounded unscorched rubber formulation can be die extruded or sheeted smoothly from a calender without lumping, a scorched material is often becomes wavy or lumpy after sheeting and must be discarded. It is therefore desirable that rubber additives be used which reduce scorching. Such compounds are commonly referred to as retarders.

It is often desirable to increase the rate at which rubbery compositions are vulcanized. Sulfur vulcanizable rubbery compositions containing free sulfur are made to vulcanize more rapidly by the addition of an accelerator compound. Often the accelerator compound is referred to as a primary accelerator and is used in combination with another accelerator called an activator or secondary accelerator which further increases the vulcanization rate.

It is an object of this invention to provide sulfur donors which will increase the state of vulcanization of vulcanized rubbery polymers as well as compounds which are secondary accelerators (activators) and/or retarders (scorch inhibitors). Another object of the present invention is to provide processes which will improve the scorch resistance and rate of vulcanization of vulcanizable rubbery polymers and also the state of vulcanization of sulfur vulcanized rubbers.

The objects of the present invention are accomplished by a sulfur vulcanizable combination of a sulfur vulcanizable rubber and at least one compound containing the moiety

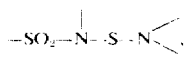

said compound being selected from

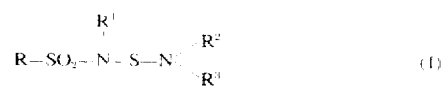

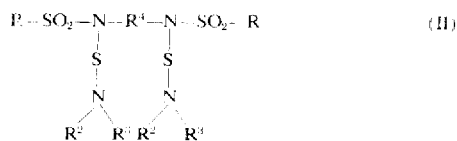

and

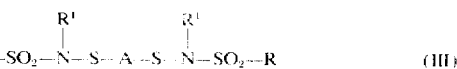

wherein A is an N,N' disubstituted radical selected from the group consisting of a. an N,N' disubstituted radical which is a derivative of a heterocyclic diamine b.

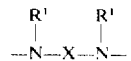

and

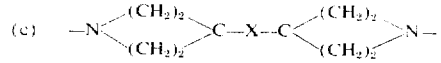

wherein R and R¹ are selected from the group consisting of alkyl radicals having 1 to 20 carbon atoms, cycloalkyl radicals having 5 to 20 carbon atoms, aralkyl radicals having 7 to 20 carbon atoms, aryl radicals having 6 to 20 carbon atoms (e.g., phenyl, p-tolyl, nitroaryl, haloaryl and alkoxyaryl) and wherein R can also be the radical

and wherein R and R¹ can be joined through a —CH₂— group to constitute with the —SO₂—N— group a heterocyclic ring radical, e.g., a sultam ring, wherein R⁵ and R⁶ are selected from the group consisting of alkyl radicals having 1 to 20 carbon atoms, cycloalkyl radicals having 5 to 20 carbon atoms, aralkyl radicals having 7 to 20 carbon atoms, and aryl radicals having 6 to 20 carbon atoms (e.g., phenyl, p-tolyl, nitroaryl, alkoxyaryl and haloaryl), and wherein R⁵ and R⁶ can be joined through a member of the group consisting of —CH₂—, —O—, and —S— to constitute with the attached nitrogen atom a heterocyclic ring, and wherein R² and R³ are selected from the group consisting of those radicals described for R⁵ and R⁶ (with the exception that neither R² nor R³ can be an aryl radical) and may join to form the heterocyclic ring described for R⁵ and R⁶ and in addition either or both R² and R³ can be hydrogen or cyanoalkyl radicals having 3 to 21 carbon atoms, wherein R⁴ is selected from the group consisting of alkylene radicals having 1 to 10 carbon atoms, cycloalkylene radicals having 6 to 20 carbon atoms and arylene radicals having 6 to 20 carbon atoms and wherein X is an alkylene radical containing 2 to 10 carbon atoms or a cycloalkylene radical containing 5 to 10 carbon atoms. Preferably R is methyl, ethyl, 2-propyl, n-butyl, n-propyl, phenyl, p-tolyl, p-chlorophenyl, dimethylamino, morpholino, piperidino, p-methoxyphenyl, p-nitrophenyl or cyclohexyl.

Preferably $R^1$ is methyl, ethyl, 2-propyl, t-butyl, n-butyl, n-propyl, phenyl, p-tolyl, p-chlorophenyl, cyclohexyl, p-methoxyphenyl or p-nitrophenyl.

Preferably the

radical is morpholino, 2,6-dimethylmorpholino, piperidino, diethylamino, diisopropylamino, 3-methylpiperidino, t-butyl amino, dicyclohexylamino, N-β-cyanoethylcyclohexylamino, N-β-cyanoethyl-t-butylamino, N-βcyanoethyl-n-butylamino, N-ethylbenzylamino, dibenzylamino, N-cyanomethylcyclohexylamino, N-cyanomethyl-n-butylamino, bis-(β-cyanoethyl)amino, amino, dimethylamino, N-methylethylamino, pyrrolidino or tert-octylamino.

Preferably $R^4$ is ethylene, 1,3-propylene, 1,4-cyclohexylene or p-phenylene.

Preferably when A is an N,N' disubstituted radical which is a derivative of a heterocyclic diamine, the diamine is piperazine, imidazolidine, hexahydropyrimidine or homopiperazine, said amines (radicals) being unsubstituted or substituted on the ring carbons by methyl groups, the total number of methyl groups being less than three. It should be understood that the above radicals need not actually be derived from the above diamines but need only be the radicals which can be derived from said diamines. That is, the compounds are not limited to their method of preparation.

More preferably A is piperazine, 2,5-dimethylpiperazine, imidazolidine, hexahydropyrimidine, homopiperazine, N,N'-dimethylethylenediamine, N,N'-dimethyl-1,3-propylenediamine, N,N'-dimethyl-1,6-hexamethylenediamine, N,N'-dimethyl-1,4-cyclohexylenediamine, 4,4'-ethylenedi (piperidine), 4,4'-trimethylenedi(piperidine), 4,4'-tetramethylenedi(piperidine) or 4,4'-hexamethylenedi(piperidine).

One preferred class of compounds used within the practice of the present invention are those containing a sultam ring formed by the joining of R and $R^1$. Preferably the sultam ring contains 3 to 10 carbon atoms. The ring carbon atoms preferably are 3 to 6 in number, most preferably 3. Preferred radicals are those which can be derived from propanesultam, butanesultam, benzylsultam and 1,8-naphthosultam.

Compounds which act both as retarders and activators in butadiene/styrene elastomers (SBR) include compounds according to structural formula I where R is p-tolyl, p-chlorophenyl or dimethylamino, $R^1$ is methyl or p-tolyl or R and $R^1$ are joined to form a propanesultam ring and

is morpholino, 2,6-dimethylmorpholino, piperidino, dicyclohexylamino, N-β-cyanoethylcyclohexylamino or N-β-cyanoethyl-t-butylamino. The compounds of structural formula II where R, $R^1$ and

are as described above and $R^4$ is ethylene are also both activators and retarders in SBR. The compounds of structural formula III where R and $R^1$ are as described above and A is the N,N'-disubstituted radical which is a derivative of piperazine, are also both activators and retarders in SBR.

Compounds which act as both activators and retarders in natural rubber are those according to structural formula I where R is p-tolyl, p-chlorophenyl, methyl or dimethylamino and $R^1$ is p-tolyl or R and $R^1$ are joined to form a propane sultam ring and

is piperidino, 2,6-dimethylmorpholino, diisopropylamino, dicyclohexylamino or 3-methylpiperidino. The compounds of structural formula III where R and $R^1$ are as described above and A is the N,N' disubstituted radical which is a derivative of 4,4'-trimethylenedi(piperidine) are also both activators and retarders in natural rubber. Compounds where R, $R^1$ and

are as described above and in addition where $R^1$ is p-tolyl,

is morpholino, N-β-cyanoethylcyclohexylamino or N-β-cyanoethyl-t-butylamino and A is a derivative of piperazine, are normally retarders in natural rubber. Also acting as retarders

are any of the above, (and in addition, $R^1$ may be p-tolyl,

may be morpholino, N-β-cyanoethylcyclohexylamino or N-β-cyanoethyl-t-butylamino, and A is a derivative of piperazine) are normally retarders. Also acting as retarders in natural rubber are compounds where R, $R^1$, and

are as described above and $R^4$ is ethylene.

It is to be understood that when two identical radical designations appear more than once in a particular structural formula herein, they may be two different types of radicals. For example, in structural formula II, one R may be methyl, while the other R is butyl. Preferably, however, such radicals are identical.

The following compounds illustrate, but do not limit, the sulfonamides of the present invention.

N-methyl-N-(morpholinothio)-methanesulfonamide
N-methyl-N-(piperidinothio)-methanesulfonamide
N-n-butyl-N-(morpholinothio)-methanesulfonamide
N-phenyl-N-(morpholinothio)-methanesulfonamide
N-p-chlorophenyl-N-(morpholinothio)-methanesulfonamide
N-ethyl-N-(morpholinothio)-ethanesulfonamide
N-n-propyl-N-(morpholinothio)-ethanesulfonamide
N-n-butyl-N-(morpholinothio)-n-butanesulfonamide
N-cyclohexyl-N-(morpholinothio)-benzenesulfonamide
N-cyclohexyl-N-(pyrrolidinothio)-benzenesulfonamide
N-methyl-N-(morpholinothio)-p-chlorobenzenesulfonamide
N-phenyl-N-(morpholinothio)-benzenesulfonamide
N-methyl-N-(morpholinothio)-p-toluenesulfonamide
N-methyl-N-(2,6-dimethylmorpholinothio)-p-toluenesulfonamide
N-methyl-N-(piperidinothio)-p-toluenesulfonamide
N-t-butyl-N-(2-methylpiperidinothio)-1-propanesulfonamide
N-methyl-N-(3-methylpiperidinothio)-p-toluenesulfonamide
N-p-methoxyphenyl-N-(4-methylpiperidinothio)-2-propanesulfonamide
N-p-nitrophenyl-N-(pyrrolidinothio)-cyclohexanesulfonamide
N-methyl-N-(di-n-propylaminothio)-p-toluenesulfonamide
N-methyl-N-(diisopropylaminothio)-p-toluenesulfonamide
N-methyl-N-(di-n-butylaminothio)-p-toluenesulfonamide
N-methyl-N-(di-n-octylaminothio)-p-toluenesulfonamide
N-methyl-N-(dicyclohexylaminothio)-p-toluenesulfonamide
N-methyl-N-(N'-methylcyclohexylaminothio)-p-toluenesulfonamide
N-methyl-N-(dibenzylaminothio)-p-toluenesulfonamide
N-methyl-N-(tert-butylaminothio)-p-toluenesulfonamide
N-methyl-N-(tert-octylaminothio)-p-toluenesulfonamide
N-methyl-N-(aminothio)-p-toluenesulfonamide
N-methyl-N-(N'-cyanomethyl-n-butylaminothio)-p-toluenesulfonamide
N-methyl-N-(N'-β-cyanoethylcyclohexylaminothio)-p-toluenesulfonamide
N-methyl-N-(N'-β-cyanoethyl-tert-butylaminothio)-p-toluenesulfonamide
N-methyl-N-[N',N'-bis-(β-cyanoethyl)aminothio]-p-toluenesulfonamide
1,4-bis-(N-methyl-p-toluenesulfonamidothio)-piperazine
2,5-Dimethyl-1,4-bis-(N-methyl-p-toluenesulfonamidothio)-piperazine
4,4'-Trimethylenedi-(piperidinothio)-bis-(N-methyl-p-toluenesulfonamide)
N-methyl-N-(N'-cyanomethylcyclohexylaminothio)-p-nitrobenzenesulfonamide
N-i-propyl-N-(N'-ethylbenzylaminothio)-p-toluenesulfonamide
N,N'-bis-(morpholinothio)-N,N'-ethylenebis-(p-toluenesulfonamide)
N-cyclohexyl-N-(morpholinothio)-p-methoxybenzenesulfonamide
N,N,N'-trimethyl-N'-(morpholinothio)-sulfamide
N,N-dimethyl-N'-cyclohexyl-N'-(dicyclohexylaminothio)-sulfamide
N,N-dimethyl-N'-p-chlorophenyl-N'-(2,6-dimethylmorpholinothio-sulfamide
N,N-diphenyl-N'-p-tolyl-N'-(pyrrolidinothio)-sulfamide
N,N-dimethyl-N'-p-tolyl-N'-(morpholinothio)-sulfamide
N-methyl-N-(morpholinothio)-4-morpholinesulfonamide
N-methyl-N-(4-methylpiperidinothio)-1-piperidinesulfonamide
N-(morpholinothio)-propanesultam
N-(morpholinothio)-butanesultam
N-benzyl-N-(dimethylaminothio)-α-toluenesulfonamide
1,4-Bis-(N-methyl-p-toluenesulfonamidothio)-homopiperazine
1,3-Bis-(N-methylmethanesulfonamidothio)-imidazolidine
1,3-Bis-(N,N,N'-trimethylsulfamidothio)-hexahydropyrimidine
N,N'-dimethyl-N,N'-bis-(N-methyl-p-toluenesulfonamidothio)ethylenediamine
N,N'-dimethyl-N,N'-bis-(N-methylbenzenesulfonamidothio)-1,3-propylenediamine
N,N'-dimethyl-N,N'-bis-(N-phenyl-p-chlorophenylbenzenesulfonamidothio)-1,2-propylenediamine
N,N'-dimethyl-N,N'-bis-(N-p-chlorophenylbenzenesulfonamidothio)-1,6-hexamethylenediamine
N,N'-dimethyl-N,N'-bis-(N-cyclohexyl-1-piperidinesulfonamidothio)-1,4-cyclohexanediamine
4,4'-Ethylenedi-(piperidinothio)-bis-(N-methylmethanesulfonamide)
4,4'-Tetramethylenedi-(piperidinothio)-bis-(N-butylbenzenesulfonamide)
4,4'-Pentamethylenedi-(piperidinothio)-bis-(N,N,N'-trimethylsulfamide)
4,4'-Hexamethylenedi-(piperidinothio)-bis-(N-p-nitrophenyl-p-toluenesulfonamide)
N,N'-bis-(N''-methylethylaminothio)-N,N'-1,3-propylenebis(p-toluenesulfonamide)
N,N'-bis-(morpholinothio)-N,N'-1,4-cyclohexylenebis(p-toluenesulfonamide)
N,N'-bis(morpholinothio)-N,N'-p-phenylenebis(p-toluenesulfonamide)

When used with a conventional primary accelerator, the compounds of structural formulae (I), (II) and (III) provide a vulcanizable polymer with balanced processing and vulcanization characteristics. In many vulcanization systems they provide both improved scorch resistance and improved activation characteristics. In systems where they provide only improved scorch resistance or improved activation characteristics, they do so without adversely affecting the scorch resistance or conversely the activation characteristics. This is unique in that conventional retarders normally adversely affect vulcanization rates, much less improve the rate; while conventional activators normally adversely affect scorch, much less improve scorch resistance. Whether these compounds act as both activators and retarders, or just as an activator, or just as a retarder, is not only dependent upon the primary accelerator being used but also upon the particular polymer being vulcanized as well as the particular sulfur donor compound of the present invention being used. The effect of accelerator systems, polymeric environment and different sulfur donor compounds is illustrated herein. It should be noted, however, that regardless of the accelerator system used or the particular polymer vulcanized, the compounds almost always act as sulfur donors. In any case, the sulfonamides of the present invention will act at least as one of the following: a sulfur donor, an activator or a retarder.

The sulfonamides of the present invention can be prepared by reaction of an aminesulfenyl chloride with an alkali metal salt of an appropriate sulfonamide, sulfamide, or sultam in the presence of an organic acid acceptor such as pyridine or triethylamine. The aminesulfenyl chlorides, in turn, may be prepared using any of the available methods described in the literature, as for example, by chlorination of an N,N'-dithiobis(amine) [Ger. Pat. No. 965,968 (1954)], or by reaction of a secondary amine with sulfur dichloride in the presence of an organic acid acceptor [Ger. Pat. No. 1,131,222 (1962)]. Generally a solution of the aminosulfenyl chloride in an inert solvent is added to a solution or suspension of the sulfonamide, sulfamide, or sultam (or its alkali metal salt), also in an inert solvent.

Alternatively, the delayed action activators of the present invention can be prepared by reaction of a sulfonamide-, sulfamide-, or sultam-N-sulfenyl chloride with an appropriate amine in the presence of an organic acid acceptor such as triethylamine, pyridine, or an excess of the amine which is entering into the reaction with the sulfenyl chloride. The sulfonamide-, sulfamide-, and sultam-N-sulfenyl chlorides, in turn, are readily prepared by any of the methods found in the literature such as by chlorination of an N,N'-dithiobis(sulfonamide), (sulfamide) or (sultam) [Ger. Pat. No. 1,101,407 (1961)], or by reaction of an alkali metal salt of a sulfonamide, sulfamide, or sultam (or its acidic form in the presence of an organic acid acceptor) with sulfur dichloride [Ger. Pat. No. 1,156,403 (1964)]. Generally, an amine is added to a solution of the sulfonamide-, sulfamide-, or sultam-N-sulfenyl chloride in an inert solvent. The performance of the compounds of the present invention as retarders, activators or in increasing the state of vulcanization is not dependent upon their method of preparation.

The sulfonamides of the present invention can be used with any conventional compounding additive such as carbon black, zinc oxide, antidegradants and stearic acid. They can be used in a sulfurless system with an accelerator (a sulfur donor or otherwise), preferably a primary accelerator, or with a sulfur vulcanization agent in the presence of an accelerator. For the purposes of this invention, sulfur vulcanizing agent means elemental sulfur (free sulfur) or sulfur donating vulcanizing agents, for example, an amine disulfide or a polymeric polysulfide. Preferably the sulfonamides are used with both a sulfur vulcanization agent, preferably free sulfur, and an accelerator, preferably a primary accelerator. The invention is applicable to vulcanization accelerators of various classes using conventional accelerator levels. Regardless of what accelerator is used, the sulfonamides will still normally act as sulfur donors. For example, rubber mixes containing the aromatic thiazole accelerators which include N-cyclohexyl-2-benzothiazolesulfenamide, 2-mercaptobenzothiazole, N-tertbutyl-2-benzothiazolesulfenamide, 2-benzothiazolyl diethyldithiocarbamate and 2-(morpholinothio)-benzothiazole can be used. Other thiazole accelerators which may be used include 2-(aminodithio)-thiazoles and 2-(aminotrithio)-thiazoles such as 2-(morpholinodithio)-benzothiazole. Amine salts of mercaptobenzothiazole accelerators, for example, the t-butylamine salt of mercaptobenzothiazole, and like salts of morpholine and 2,6-dimethylmorpholine can be used in the invention. Thiazole accelerators other than aromatic can be used. Stocks containing accelerators, for example, tetramethylthiuram disulfide, tetramethylthiuram monosulfide, aldehyde amine condensation products, thiocarbamylsulfenamides, thioureas, xanthates, and guanidine derivatives are substantially improved using the process of the present invention.

The sulfonamides of the invention can be used in natural and synthetic rubbers and mixtures thereof. Synthetic rubbers that can be improved by the process of this invention include homopolymers and copolymers of dienes, both conjugated and nonconjugated, e.g., 1,3-dienes such as 1,3-butadiene and isoprene. Examples of such synthetic rubbers include neoprene (polychloroprene), cis-1,4 polybutadiene, cis-1,4 polyisoprene, butyl rubber, copolymers of 1,3-butadiene or isoprene with monomers such as styrene, acrylonitrile and methyl methacrylate. Ethylene/propylene terpolymers, for example ethylene/propylene/dicyclopentadiene terpolymers also benefit from the practice of the present invention.

The sulfonamides can be added to the rubbers by any conventional technique such as milling or Banburying.

All of the working examples herein are intended to illustrate but not limit the scope of the present invention. Unless indicated otherwise, all parts are parts by weight.

The following examples, 1 to 7, illustrate the preparation of various sulfonamides of the present invention, and are not intended to limit the scope of the present invention.

EXAMPLE 1

To prepare N-(morpholinothio)-N-methyl-p-toluenesulfonamide, 4.72 grams (0.035 mole) of sulfuryl chloride was added to a refluxing solution of 15.1 grams (0.035 mole) N,N'-dimethyl-N,N'-dithiobis-(p-toluenesulfonamide) in 60 ml. of methylene chloride. After two hours, the solution was cooled in a dry ice-acetone bath and 12.2 grams (0.14 mole) of morpholine was added dropwise at −25° to −30° C. The precipitated morpholine hydrochloride was filtered off, the filtrate extracted with 100 ml. of water, dried (MgSO$_4$), concentrated in vacuo, and the solid residue recrystallized from methanol to afford 17.3 grams (81.9%) of product with a melting point of 90°–92° C. Analysis of this product shows 20.7 percent sulfur and 9.29 percent nitrogen. Calculated percentages for C$_{12}$H$_{18}$N$_2$O$_3$S$_2$ are 21.1 percent sulfur and 9.27 percent nitrogen. The infrared spectrum was consistent with the proposed structure.

EXAMPLE 2

N-(piperidinothio)-N-methyl-p-toluenesulfonamide was prepared as described in Example 1 except that 11.9 grams of piperidine were used in place of morpholine. The yield of product after recrystallization from methanol was 11.6 grams (55.2%) with a melting point of 65°–67° C. Analysis of this product shows 9.29 percent nitrogen and 21.1 percent sulfur. Calculated percentages for C$_{13}$H$_{20}$N$_2$O$_2$S$_2$ are 9.33 percent nitrogen and 21.3 percent sulfur.

EXAMPLE 3

1,4-Bis-(N-methyl-p-toluenesulfonamidothio)-piperazine was prepared as described in Example 1 except that a mixture of 3.0 grams of piperazine and 8.5 grams of triethylamine was added in place of morpholine. After recrystallization from dioxane, 7.5 grams (41.5%) of product was obtained with a melting point of 204°–205.5° C. Analysis shows 10.78 percent nitrogen and 24.5 percent sulfur. The calculated percentages for C$_{20}$H$_{28}$N$_4$O$_4$S$_4$ are 10.85 percent nitrogen and 24.8 percent sulfur.

EXAMPLE 4

To prepare N-methyl-N-(diisopropylaminothio)-p-toluenesulfonamide, 0.25 mole of chlorine gas was added over a one-half hour period to a solution of 66.0 grams (0.25 mole) N,N'-dithiobis(diisopropylamine) in 100 ml. of carbon tetrachloride at 0°–5° C. The resulting diisopropylaminesulfenyl chloride solution was then added during one-half hour to a suspension of 0.50 mole of the sodium salt of N-methyl-p-toluenesulfonamide in 500 ml. of toluene, maintaining the temperature at 0°–10° C. The reaction mixture was stirred for 1 hour after addition of the sulfenyl chloride, then filtered, and the filtrate concentrated in vacuo. The resulting oily solid residue was slurried in hexane, filtered, and the solid recrystallized from methanol to afford 79.1 grams (50.1%) product with a melting point of 85°–88° C. Analysis of the product shows 8.82 percent nitrogen and 19.1 percent sulfur. Calculated percentages for C$_{14}$H$_{24}$N$_2$O$_2$S$_2$ are 8.86 percent nitrogen and 20.2 percent sulfur.

EXAMPLE 5

To prepare N-methyl-N-(3-methylpiperidinothio)-p-toluenesulfonamide, 0.15 mole of chlorine gas was added over a twenty minute period to a solution of 39.0 grams (0.15 mole) of N,N'-dithiobis-(3-methylpiperidine) in 250 ml. of toluene at 0°–5° C. The resulting 3-methylpiperidinesulfenyl chloride solution was then added during 45 minutes to a suspension of 0.30 mole of the sodium salt of N-methyl-p-toluenesulfonamide in 300 ml. of toluene. The reaction mixture was stirred for one hour after the addition of the sulfenyl chloride. Water (200 ml.) was added, the upper layer removed, dried over anhydrous magnesium sulfate, and concentrated in vacuo giving a red oil. Upon dilution with ether and cooling in a dry ice-acetone bath, the oil solidified, the solid filtered, and recrystallized from ether-petroleum ether. The yield of product was 48.3 grams (51.3%) with a melting point of 64°–66° C. Analysis shows 8.76 percent nitrogen and 20.10 percent sulfur. The calculated percentages for C$_{14}$H$_{22}$N$_2$O$_2$S$_2$ are 8.92 percent nitrogen and 20.38 percent sulfur.

EXAMPLE 6

To prepare N,N,N'-trimethyl-N'-(morpholinothio)-sulfamide, 0.11 mole of chloride gas was added over a ten minute period to a mixture of 23.6 grams (0.10 mole) 4,4'-dithiobis-(morpholine) in 100 ml. of toluene at 0°–5° C. The resulting morpholinesulfenyl chloride solution was then added dropwise to a suspension of 0.20 mole of the sodium salt of N,N,N'-trimethylsulfamide in 250 ml. of toluene. After addition of the sulfenyl chloride, the mixture was stirred 1 hour, poured into 200 ml. of water, the upper toluene layer separated, dried over anhydrous magnesium sulfate, and concentrated in vacuo. The resulting solid residue was recrystallized from methanol. The yield of product was 45.0 grams (88.3%) with a melting point of 57°–60° C. Analysis showed 16.54 percent nitrogen and 24.96 percent sulfur. The calculated percentages for C$_7$H$_{17}$N$_3$O$_3$S$_2$ are 16.47 percent nitrogen and 25.10 percent sulfur.

EXAMPLE 7

N-(morpholinothio)-propanesultam was prepared by adding 0.099 mole of morpholinesulfenyl chloride in 50 ml. of toluene, dropwise to a suspension of 0.099 mole of the sodium salt of propanesultam in 150 ml. of toluene. The product was isolated by pouring the reaction mixture into 200 ml. of water, adding sufficient chloroform to dissolve the resultant solid, the organic layer separated, dried over anhydrous magnesium sulfate, and concentrated in vacuo. The resulting solid residue was recrystallized from 2-propanol-benzene. The yield of product was 18.5 grams (79.0%) with a melting point of 139°–142° C. Analysis shows 11.77 percent nitrogen and 26.94 percent sulfur. The calculated percentages for C$_7$H$_{14}$N$_2$O$_3$S$_2$ are 11.76 percent nitrogen and 26.89 percent sulfur.

The other compounds included within the practice of the present invention can be prepared by using the same or similar techniques as described in the preceding working examples. Synthetic routes to these compounds are not limited, however, to these particular reactions and procedures.

Tables I, II, III and IV illustrate the use of various sulfonamides of the present invention with different rubber stocks. The compositions are intended only to be illustrative of the practice of the present invention and not limiting. Mooney Scorch tests were performed using the large rotor as described in ASTM D 1646-61. A recorder was employed to continuously plot viscosity versus time. The number of minutes ($t$ Δ 5) required for the viscosity curve to rise five points above the minimum was taken as a measure of scorch inhibition. Larger values for ($t$ Δ 5) indicate a greater resistance to scorch or premature vulcanization.

Data on vulcanizing characteristics were obtained with a Monsanto Oscillating Disc Rheometer, as described by Decker, Wise, and Guerry in *Rubber World*, page 68, December 1962. Pertinent data from this instrument are: $t_4$, the minutes required for the Rheometer torque curve to rise four units above the minimum torque value, and $t_{90}$, the minutes required for the torque curve to reach 90 percent of the difference between the maximum and minimum torque values.

The $t_{90}$ value is considered to be the time required to reach the optimum vulcanized state. The difference, $(t_{90} - t_4)$ is indicative of the time necessary for actual vulcanization to take place after the scorch delay period has ended, i.e., is a relative measure of vulcanization rate. Compounds which increase $t_4$, but do not greatly increase $(t_{90} - t_4)$ are preferred since these impart processing safety, yet do not require greatly extended vulcanization times.

ΔRh is the difference between the maximum and minimum torque obtained on the rheometer curve. It is used as a measure of the degree (state) of vulcanization.

The following Examples 8 to 45 illustrate the use of the sulfur donors of the present invention in both natural rubber and SBR (butadiene/styrene elastomer). Stock A was used in Examples 8 to 27 while Stock B was used in Examples 28 to 45. Both stocks were run with no sulfonamide (control), 0.5 part and 1.0 part of the sulfonamide.

Table I

|  | Stock A (parts) | Stock B (parts) |
|---|---|---|
| SBR 1712 | — | 137.5 |
| Smoked sheets | 100 | — |
| Carbon black | 50 | 68 |
| Stearic acid | 3 | 1.5 |
| Wax | 3 | — |
| Zinc oxide | 3 | 5 |
| Amine antioxidant | 1 | — |
| Sulfur | 2.5 | 1.5 |
| 2-(Morpholinodithio)-benzothiazole | 0.5 | 1 |
| Sulfonamide | 0–0.5–1.0 | 0–0.5–1.0 |

The results obtained using Stock A are listed in Table III and the results using Stock B in Table IV. The rheometer data was obtained at a temperature of 275° F. in natural rubber and 302° F. in SBR. The Mooney Scorch data was determined at 250° F. in natural rubber and 270° F. in SBR.

The effect of the sulfonamides was measured by comparison with the control, i.e., the stock with no sulfonamide present. Ratios of the measurements for the sulfonamide compounded stocks over the measurements for the control stock are listed in the tables. The c subscript indicates that the measurement was made on the control stock. Values of ΔRh/ΔRh$_c$ which are over 1.00 indicate that the sulfonamide has increased the state of vulcanization. Values of $(t_{90} - t_4)/(t_{90} - t_4)_c$ which are less than 1.0, indicate an activating effect of the sulfonamide on the vulcanization rate. Values of $tΔ_5/tΔ_{5c}$ which are over 1.0 indicate that the sulfonamide has increased the scorch delay time, i.e., increased scorch resistance.

Table II contains a list of the various sulfonamides evaluated.

Table II

| | Sulfonamide |
|---|---|
| A | N-methyl-N-(morpholinothio)-p-toluenesulfonamide |
| B | N-methyl-N-(piperidinothio)-p-toluenesulfonamide |
| C | 4,4'-Trimethylenedi-(piperidinothio)-bis-(N-methyl-p-toluenesulfonamide) |
| D | N-methyl-N-(2,6-dimethylmorpholinothio)-p-toluenesulfonamide |
| E | N-methyl-N-(diisopropylaminothio)-p-toluenesulfonamide |
| F | N,N'-bis-(N-methyl-p-toluenesulfonamidothio)-piperazine |
| G | N-methyl-N-(tert-butylaminothio)-p-toluenesulfonamide |
| H | N-methyl-N-(dicyclohexylaminothio)-p-toluenesulfonamide |
| I | N-methyl-N-(N'-β-cyanoethylcyclohexylaminothio)-p-toluenesulfonamide |
| J | N-methyl-N-[N',N'-bis-(β-cyanoethyl)aminothio]-p-toluenesulfonamide |
| K | N-methyl-N-(morpholinothio)-p-chlorobenzenesulfonamide |
| L | N-methyl-N-(morpholinothio)-methanesulfonamide |
| M | N-methyl-N-(N'-β-cyanoethyl-tert-butylaminothio)-p-toluenesulfonamide |
| N | N-methyl-N-(3-methylpiperidinothio)-p-toluenesulfonamide |
| O | N,N,N'-trimethyl-N'-(morpholinothio)-sulfamide |
| P | N,N-dimethyl-N'-p-tolyl-N'-(morpholinothio)-sulfamide |
| Q | N-(morpholinothio)-propanesultam |
| R | N-phenyl-N-(morpholinothio)-benzenesulfonamide |
| S | N,N'-bis(morpholinothio)-N,N'-ethylenebis-(N-methyl-p-toluenesulfonamide) |
| T | N-methyl-N-(aminothio)-p-toluenesulfonamide |

Table III

Natural Rubber

| Exp. | Sulfonamide | ΔRh/ΔRh$_c$ (parts) | | $(t_{90}-t_4)/(t_{90}-t_4)_c$ (parts) | | tΔ5/tΔ5$_c$ (parts) | |
|---|---|---|---|---|---|---|---|
| | | 0.5 | 1.0 | 0.5 | 1.0 | 0.5 | 1.0 |
| 8 | A | 1.13 | 1.24 | .95 | 1.00 | 1.28 | 1.46 |
| 9 | B | 1.25 | 1.28 | .80 | .85 | 1.08 | 1.40 |
| 10 | C | 1.15 | 1.19 | .91 | .99 | 1.01 | 1.18 |
| 11 | D | 1.14 | 1.22 | .94 | .94 | 1.29 | 1.42 |
| 12 | E | 1.14 | 1.23 | .94 | .90 | 1.21 | 1.25 |
| 13 | F | 1.05 | 1.14 | 1.07 | 1.11 | 1.18 | 1.16 |
| 14 | G | 1.16 | 1.24 | .86 | .96 | .97 | .88 |
| 15 | H | 1.20 | 1.19 | .80 | .84 | 1.05 | 1.26 |
| 16 | I | 1.11 | 1.13 | .99 | 1.02 | 1.18 | 1.44 |
| 17 | J | 1.07 | 1.12 | .94 | .91 | .95 | .95 |
| 18 | K | 1.17 | 1.18 | .83 | .87 | 1.20 | 1.45 |
| 19 | L | 1.23 | 1.23 | .83 | .89 | 1.20 | 1.69 |
| 20 | M | 1.09 | 1.09 | .99 | 1.06 | 1.18 | 1.37 |
| 21 | N | 1.24 | 1.32 | .81 | .84 | 1.23 | 1.43 |
| 22 | O | 1.14 | 1.23 | .93 | .98 | 1.23 | 1.45 |
| 23 | P | 1.16 | 1.25 | .86 | .88 | 1.23 | 1.41 |
| 24 | Q | 1.20 | 1.28 | .96 | .98 | 1.38 | 1.57 |
| 25 | R | 1.12 | 1.12 | .88 | .83 | .97 | 1.07 |
| 26 | S | 1.12 | 1.24 | 1.04 | 1.00 | 1.30 | 1.27 |
| 27 | T | 1.08 | 1.12 | .88 | .80 | .78 | .60 |

As indicated by the above data in Table III, the sulfur donors increased the state of vulcanization in every instance. In addition, all compounds acted as activators and/or retarders. Over half of the compounds not only increased the state of vulcanization and improved resistance to scorching, but also increased the rate of vulcanization.

Table IV (SBR)

| Exp. | Sulfonamide | ΔRh/ΔRh$_c$ (parts) | | $(t_{90}-t_4)/(t_{90}-t_4)_c$ (parts) | | tΔ5/tΔ5$_c$ (parts) | |
|---|---|---|---|---|---|---|---|
| | | 0.5 | 1.0 | 0.5 | 1.0 | 0.5 | 1.0 |
| 28 | A | 1.10 | 1.12 | .85 | .70 | 1.19 | 1.26 |
| 29 | B | 1.12 | 1.21 | .58 | .48 | 1.12 | 1.20 |
| 30 | C | 1.12 | 1.20 | .84 | .46 | .98 | 1.02 |
| 31 | D | 1.06 | 1.11 | .77 | .65 | 1.16 | 1.20 |

Table IV-Continued (SBR)

| Exp. | Sulfo-namide | ΔRh/ΔRh, (parts) 0.5 | 1.0 | $(t_{40}-t_4)/(t_{40}-t_4)_c$ (parts) 0.5 | 1.0 | tΔ5/tΔ5, (parts) 0.5 | 1.0 |
|---|---|---|---|---|---|---|---|
| 32 | E | 1.10 | 1.17 | .71 | .46 | .87 | .85 |
| 33 | F | 1.06 | 1.10 | .86 | .82 | 1.42 | 1.52 |
| 34 | G | 1.08 | 1.15 | .78 | .71 | .98 | .95 |
| 35 | H | 1.05 | 1.09 | .55 | .50 | 1.07 | 1.11 |
| 36 | I | 1.00 | 1.04 | 1.00 | .96 | 1.15 | 1.12 |
| 37 | J | 1.12 | 1.09 | 1.01 | .94 | * | * |
| 38 | K | 1.09 | 1.17 | .81 | .76 | 1.08 | 1.16 |
| 39 | L | 1.23 | 1.40 | .78 | .73 | .81 | .97 |
| 40 | M | 1.07 | 1.14 | .97 | .95 | 1.15 | 1.16 |
| 41 | O | 1.08 | 1.19 | .73 | .63 | 1.07 | 1.25 |
| 42 | P | 1.06 | 1.12 | .74 | .61 | 1.07 | 1.17 |
| 43 | Q | 1.11 | 1.18 | .70 | .57 | 1.20 | 1.11 |
| 44 | R | 1.06 | 1.00 | .87 | .73 | 1.07 | .89 |
| 45 | S | 1.08 | 1.12 | .77 | .62 | 1.11 | 1.23 |

*The Mooney Scorch data for the control was abnormally low. Therefore the ratios have been omitted. Sulfonamide J, however, did act as a retarder as indicated by the Monsanto Rheometer $t_4$ values. The control had a value of 12.6 while sulfonamide J had a value of 13.9 at the 0.5 part level and 13.8 at the 1.0 part level.

As indicated by the above data in Table IV, only five of the compounds failed to act as retarders in SBR at both the 0.5 and 1.0 part level. Only two failed to act as activators. All of the compounds acted as sulfur donors to increase the state of vulcanization with two exceptions; I did not act as a sulfur donor at the 0.5 part level, and R did not act as a sulfur donor at the 1.00 part level. However, both acted as activators.

The sulfur donors can be used with any accelerator. N-methyl-N-(morpholinothio)-p-toluenesulfonamide was used at the 0.5 part level with 2-(morpholinothio)-benzothiazole (0.5 part) and sulfur in natural rubber. The sulfonamide not only increased the state of vulcanization but also acted as a retarder, while having little adverse affect on the vulcanization rate.

When used at the 1.0 part level in a butadiene/styrene elastomer with sulfur and 1.0 part of N-cyclohexyl-2-benzothiazolesulfenamide, the same sulfonamide not only acted as a sulfur donor and a retarder, but acted as an activator as well.

N-methyl-N-(morpholinothio)-p-toluenesulfonamide was used in a carbon black loaded natural rubber system using 2-(morpholinodithio)-benzothiazole as a primary accelerator and free sulfur. In one instance 0.25 part of diphenylguanidine was used and in another instance, 0.20 part of tetramethylthiuram disulfide. In both instances the state of vulcanization and scorch delay time were increased although the rate of vulcanization was decreased.

N-methyl-N-(morpholinothio)-p-toluenesulfonamide was used in a carbon black loaded natural rubber system, in one instance with 2-(morpholinothio)-benzothiazole and in another instance with mercaptobenzothiazole, using 2.5 parts of free sulfur. The sulfonamide increased the state of vulcanization, the rate of vulcanization and the scorch delay time in both instances.

The above examples are not intended to be limiting but rather illustrative. Any of the sulfur donors, accelerators and rubbers described earlier herein can be substituted in the preceding examples. In addition, the levels of the sulfur donors and other components in said examples could be altered in accordance with the general teachings herein.

The additives of this invention can be used at various concentrations as low as 0.25 part per 100 parts by weight of rubber and even as low as 0.10 or even 0.05 part. Conventional levels would frequently be 0.5 and 1.0 part, although levels as high as 1.5, 3.0, 5.0 and even 10 parts can be used. Most frequently the concentration ranges from 0.25 to 5.0 parts, more preferably from 0.25 to 3.0 parts and most preferably from 0.25 to 1.50 parts.

The sulfur donor compounds of the present invention are preferably added to the rubbery polymer at the same time that the accelerator is added, although this order of addition is not necessary to the successful utilization of the compounds of this invention.

The compounds of the present invention are effective in the presence of organic accelerators whether they are diarylguanidines such as diphenylguanidine, or thiazoles more specifically benzothiazyl amino disulfides, such as 2-(morpholinodithio)-benzothiazole, or thiazoles (also sulfenamides), more specifically thiazolesulfenamides, and even more specifically benzothiazolesulfenamides such as 2-(morpholinothio)-benzothiazole and N-cyclohexyl-2-benzothiazolesulfenamide, i.e., regardless of what type of organic accelerator is used. Thiuram sulfides such as tetramethylthiuram monosulfide and disulfide and tetraethylthiuram monosulfide and disulfide may also be used as well as other benzothiazolesulfenamides such as N-(t-butyl)-2-benzothiazolesulfenamide.

Various organic accelerators useful within the practice of this invention are described and illustrated in the *Vanderbilt Rubber Handbook*, 1968 Edition, R. T. Vanderbilt Company, Inc., particularly at pages 242 and 244 and also in the bulletin of the Elastomer Chemicals Dept. of the E. I. Du Pont de Nemours and Co. (inc.) entitled, "Accelerators, Vulcanizing Agents and Retarders, Brochure No. SD A54457."

The polymers in which the sulfonamides of the present invention are incorporated remain suitable for their art recognized uses, e.g., in tires and industrial products.

Compounds referred to earlier herein as being retarders and/or activators in natural rubber and SBR are merely illustrative and not limiting.

The balanced processing and vulcanization characteristics are most often obtained when free sulfur (elemental sulfur) and a primary accelerator are used with the sulfonamide.

Sometimes compounds are both a sulfur donor (and therefore a sulfur vulcanizing agent) and an accelerator, e.g., 2-(morpholinodithio)-benzothiazole. Such compounds can be used with the sulfonamides, with or without another sulfur vulcanizing agent and/or another accelerator.

The compounds of the present invention can be used effectively in any sulfur vulcanizable polymer and with any organic accelerating agent.

While certain representative embodiments and details have been shown for the purpose of illustrating the invention, it will be apparent to those skilled in this art that various changes and modifications may be made therein without departing from the spirit or scope of the invention.

What is claimed is:

1. A sulfur vulcanizable diene polymer having incorporated therein a sulfonamide having the following structural formula

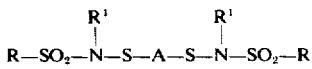

wherein A is an N,N' disubstituted radical selected from the group consisting of
a. an N,N' disubstituted radical which is a derivative of a heterocyclic diamine
b.

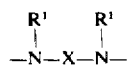

and (c) 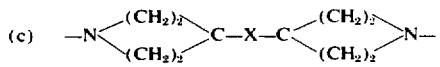

wherein R and R$^1$ are selected from the group consisting of alkyl radicals having 1 to 20 carbon atoms, cycloalkyl radicals having 5 to 20 carbon atoms, aralkyl radicals having 7 to 20 carbon atoms, aryl radicals having 6 to 20 carbon atoms and wherein R can also be the radical

and wherein R and R$^1$ can be joined through a —CH$_2$— group to constitute with the —SO$_2$—N— group a heterocyclic ring radical, wherein R$^5$ and R$^6$ are selected from the group consisting of alkyl radicals having 1 to 20 carbon atoms, cycloalkyl radicals having 5 to 20 carbon atoms, aralkyl radicals having 7 to 20 carbon atoms, and aryl radicals having 6 to 20 carbon atoms and wherein R$^5$ and R$^6$ can be joined through a member of the group consisting of —CH$_2$—, —O—, and —S— to constitute with the attached nitrogen atom a heterocyclic ring, and wherein X is selected from the group consisting of alkylene radicals having 2 to 10 carbon atoms and cycloalkylene radicals having 5 to 10 carbon atoms.

2. The sulfur vulcanizable diene polymer according to claim 1 wherein the polymer has incorporated therein an organic accelerating agent.

3. The sulfur vulcanizable diene polymer according to claim 1 wherein the polymer has incorporated therein a sulfur vulcanizing agent.

4. The sulfur vulcanizable diene polymer according to claim 2 wherein the organic accelerating agent is a primary accelerator and the polymer has incorporated therein elemental sulfur.

5. The sulfur vulcanizable diene polymer according to claim 1 wherein the sulfonamide is present in the amount of from 0.25 part to 5.0 parts by weight per 100 parts by weight of polymer.

6. The sulfur vulcanizable diene polymer according to claim 1 wherein R is selected from the group consisting of methyl, ethyl, 2-propyl, n-butyl, n-propyl, phenyl, p-tolyl, p-chlorophenyl, dimethylamino, morpholino, piperidino, p-methoxyphenyl, p-nitrophenyl and cyclohexyl, wherein R$^1$ is selected from the group consisting of methyl, ethyl, 2-propyl, t-butyl, n-butyl, n-propyl, phenyl, p-tolyl, p-chlorophenyl, cyclohexyl, p-methoxyphenyl and p-nitrophenyl.

7. The sulfur vulcanizable diene polymer according to claim 1 wherein the sulfonamide is N,N'-bis-(N-methyl-p-toluenesulfonamidothio)-piperazine.

* * * * *